(12) United States Patent
Schmidt et al.

(10) Patent No.: US 6,695,369 B2
(45) Date of Patent: Feb. 24, 2004

(54) DEVICE AND METHOD FOR PICKING UP AND PLACING OBJECTS

(75) Inventors: Kristina Schmidt, Heidelberg (DE); Dirk Vetter, Heidelberg (DE)

(73) Assignee: Graffinity Pharmaceuticals AG, Heidelberg (DE)

( * ) Notice: Subject to any disclaimer, the term of this patent is extended or adjusted under 35 U.S.C. 154(b) by 0 days.

(21) Appl. No.: 10/086,983

(22) Filed: Feb. 28, 2002

(65) Prior Publication Data

US 2002/0135190 A1 Sep. 26, 2002

(30) Foreign Application Priority Data

Sep. 1, 1999 (DE) .......................... 199 41 661

(51) Int. Cl.[7] .............................. B25J 15/00
(52) U.S. Cl. ............... 294/1.1; 294/86.4; 294/87.1; 901/30
(58) Field of Search ............... 294/1.1, 86.4, 294/87.1, 902; 271/33; 15/104.002; 901/30

(56) References Cited

U.S. PATENT DOCUMENTS

| | | | | |
|---|---|---|---|---|
| 3,658,618 A | * | 4/1972 | Gramann | 156/235 |
| 4,073,530 A | | 2/1978 | Seidler | 294/19 R |
| 5,181,755 A | * | 1/1993 | Stanwich et al. | 294/1.1 |
| 5,190,164 A | * | 3/1993 | Graves | 209/614 |
| 5,470,116 A | | 11/1995 | DeWoskin | 294/1.1 |
| 5,553,344 A | | 9/1996 | Rosenkrantz | 15/104.002 |
| 5,616,206 A | * | 4/1997 | Sakatsu et al. | 156/230 |
| 5,628,854 A | * | 5/1997 | Ball | 156/230 |
| 5,637,395 A | | 6/1997 | Uemura et al. | 428/343 |
| 5,834,062 A | * | 11/1998 | Johnson et al. | 427/256 |

FOREIGN PATENT DOCUMENTS

| | | |
|---|---|---|
| DE | 2838129 A1 | 9/1978 |
| DE | 2854359 A1 | 12/1978 |
| DE | 3010779 A1 | 3/1980 |
| DE | 4446489 C1 | 12/1994 |
| DE | 19512155 A1 | 3/1995 |
| EP | 0 671 351 A1 | 9/1995 |
| GB | 2237001 A | 8/1989 |
| WO | WO 97/40383 | 10/1997 |
| WO | WO 98/08092 | 2/1998 |
| WO | WO 98/17383 | 4/1998 |
| WO | WO 98/32000 | 7/1998 |

* cited by examiner

Primary Examiner—Dean J. Kramer
(74) Attorney, Agent, or Firm—Kagan Binder, PLLC

(57) ABSTRACT

The invention relates to a device and a method for picking up individual objects or particles and placing them in containers or cavities filled with liquid. The invention allows in particular a simple handling of the objects and thus considerably reduces the operation costs of such a plant (FIG. 2). In this method and device, an adhesive is applied to an end portion of a transport structure. An object to be transported is held by the adhesive until it is delivered to the desired location.

38 Claims, 3 Drawing Sheets

DEVICE AND METHOD FOR PICKING UP AND PLACING OBJECTS

The invention relates to a device and a method for picking up individual objects or particles and placing them in containers or cavities filled with liquid.

For picking up, transferring and placing objects or particles (pick-and-place operation) several methods are known.

If the objects to be picked up are comparatively huge and heavy, gripping devices are often used. In EP-A-0 671 351, for example, picking up and placing is realized by means of such gripping devices. The enormous technical demand and expenditure for their construction as well as the fact that it is difficult to miniaturize them is disadvantageous in these apparatuses.

In general, these disadvantages also occur if suction devices are used. DE-A-195 12 155 describes a pick-and-place machine in which particles can be transported as well as picked up and placed in chambers by means of vacuum technology. This device is moreover disadvantageous in that very complicated and expensive vacuum-stable parts are required.

As an alternative to these methods, often more economical adhesive devices are used for transporting and/or picking up, in particular for light objects. It is a disadvantage of conventional prior art methods that since the object has to be released from the adhesive surface after placing, e.g. by wiping off or spinning, it is difficult or impossible to exactly place the object. Moreover, remnants of the adhesive on the objects to be transported can be a hindrance. When being used several times, the adhesive force decreases so that it becomes necessary to replace the device or to renew the adhesive surface.

Examples for picking-up and transporting means in which adhesive surfaces are applied are DE-A-30 10 779, GB-A-2 237 001 or U.S. Pat. No. 5,470,116. It is a disadvantage of these devices that the objects have to be released manually. Automation and miniaturization is therefore impossible. Moreover, great demands are made on the adhesive because it must be strong enough that the object to be transported sticks thereon during transport; however, it must be easily possible to release the object.

A further example is disclosed in U.S. Pat. No. 5,553,344. In this device for picking up light objects a plurality of detachable sheets containing an adhesive material are used. After picking up the objects, the contaminated sheets are removed. This method is disadvantageous in that the adhesive surface must continuously be renewed. It is not intended to release the objects.

U.S. Pat. No. 5,637,395 discloses specific adhesives which allow a semiconductor wafer to be held during processing (e.g. cutting). The objects are released in that photopolymerizable compounds are added to the adhesive. After irradiation, the adhesion decreases and the wafer is released. It is a disadvantage of this invention that an expensive adhesive must be used.

U.S. Pat. No. 4,073,530 discloses a pick-up device having an adhesive surface on an end that can be flexibly shaped. The object is released by a reduction of this adhesive surface by means of a translatory movement. It is a disadvantage of this device that the shape and the weight of the object to be picked up must be such that a reduction of the adhesive surface is possible. This is not the case with round objects. It is also disadvantageous that it cannot be guaranteed that remnants of the adhesive are left on the object to be transported.

If the objects to be manipulated are small spherical and light particles, in particular synthesis resin beads, which are used in combinatorial solid-phase synthesis and high throughput screening, specific methods are disclosed which allow in particular the allocation of individual beads to wells or cavities of a microtitre plate.

WO-A-98/17383 describes the possibility of distributing a defined number of beads, which can be used in combinatorial synthesis, into a microtitre plate. However, the beads to be distributed are held in suspension. With this method it is not possible to transport individual particles. The used device needs pipette-like devices whose geometry makes a miniaturization more difficult.

WO-A-98/32000 discloses picking up individual beads and transferring them to a microtitre plate, wherein one bead each can be placed in a cavity of the microtitre plate. However, also in this case the beads are held in suspension and can thus not be selected individually. The bead is picked up by drawing up liquid until a bead blocks the inlet of the needle. A disadvantage of this method is the high demand placed on the apparatus due to the required pressure sensor means.

WO-A-98/08092 describes a method allowing the deposition of beads having essentially the same size and dimension into a predetermined grid such as a microtitre plate. For this purpose, the beads are filled in a capillary. An adhesive layer is used for fixing the beads. It is a disadvantage of this method that after allocation of the beads to individual fields the excess beads must be removed. Moreover, the allocation of the bead fields with respect to each other is predetermined. The beads in the arrays can only be transferred into the capillary system as a whole through the apertured mask. Thus, the beads cannot individually be transferred to cavities of a microtitre plate. Consequently, in principle only beads having the same size can be handled in this method. Moreover, the placement of adhesive droplets for forming an adhesive layer is relatively complicated and thus the process costs are comparatively high.

It is the object of the present invention to provide an improved device and an improved method for picking up small objects or particles and placing them in containers or cavities filled with liquid. The present invention particularly intends to overcome the above-mentioned disadvantages of the prior art. In particular, the device of the present invention and the method of the present invention should be suitable for handling synthesis beads being used in combinatorial solid-phase chemistry for drawing up combinatorial substance libraries. This object is achieved with the features of the claims.

In achieving this object, the invention starts out from the basic idea that prior to each transport operation of an object a surface of a transport means is provided with an adhesive substance, an adhesive layer or an adhesive (in the following simply "adhesive") or at least the adhesion of a probably present adhesive is increased, wherein subsequently this surface is brought in contact with the object in order to transport it. For releasing the object from the transport means, the adhesion of the adhesive is reduced or the adhesive is essentially removed completely so that it is released from the transport means.

In the meaning of the present invention, the terms "transport" and "transfer" mean the re-positioning of an object from a starting or picking-up position to an end or placing position. These terms are not restricted to any direction.

In a preferred embodiment of the present invention a respective method comprises in particular the following steps:

(a) One end of a means suitable for the transport operation, such as a rod or a pin, is immersed into an adhesive liquid or a liquid comprising adhesive substances. The end of the means is constructed such that when being brought in contact with the objects to be transported, it has a suitably large common surface, i.e. adhesive surface.

(b) After removal from the liquid, the adhesive surface is optionally dried in order to allow the adhesive substances contained in the liquid to concentrate. For example, this can be done by simply leaving it in the air.

(c) Parts of the transport means having an adhesive surface are brought in contact with the object to be transported in such a way that the object can be lifted and transferred or transported.

(d) The object is placed in a container filled with liquid or at least one cavity filled with liquid, wherein the adhesive surface between the object to be transported and the transport means is preferably removed by the liquid or at least, however, the adhesion of the adhesive is reduced considerably so that the object is released from the transport means. For example, this can be done by preparing a mixture or solution. The object is thus allowed to enter the container or cavity.

(e) After the object was released, the process can be repeated as often as required.

Adhesive liquids can, for example, be viscous compounds such as polyethylene glycols or polypropylene glycols. Examples for liquids containing adhesive substances are aqueous sugar solutions (e.g. glucose, saccharose, maltose) or concentrated saline solutions.

Liquids by means of which the objects can be released can, for example, be water, aqueous buffer or saline solutions or organic solvents or separating reagents which—in case synthesis beads are the objects to be transported—simultaneously allow the separation of compounds adhering to the beads.

In the following preferred embodiments of the device of the present invention for carrying out the method according to the present invention are explained in more detail in connection with the Figures; however, the invention is not restricted to these embodiments.

Figure 1A:
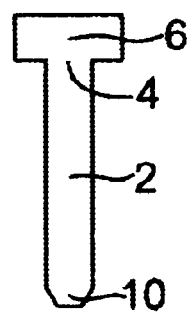
FIG. 1a shows a schematic representation of a transport means in the form of a pin for use in the pick-and-place device according to the present invention without an adhesive layer.

FIG. 1a shows a transport means in the form of a pin 2, which, for example, has the shape of a cylindrical rod or, as shown in the Figures, can have the shape of a nail. For this purpose, the shape of the transport means is non-critical and can be selected as desired as long as its end provides a surface which is sufficient for being used as the adhesive surface. The area of cross-section of the pin 2 can, for example, be circular, oval or polygonal.

The pin 2 can be guided manually or automatically, for example by means of a robot arm being movable three dimensionally (X, Y and Z direction). The upper end 4 of the pin 2 additionally comprises preferably a mounting device or a flange 6 in order to hold or, if necessary, guide it at a support element 8. The mounting device 6 is preferably formed integrally or as one piece with the pin 2. Particularly suitable are stainless steels which fulfill the requirement of being workable very precisely (production, positioning). This becomes more and more evident as miniaturization increases. A further prerequisite is the resistance against the used liquids (resistance against chemicals). A certain own weight of the pins is advantageous, so that after a vertical movement out of the recess 20 they return to their original position; alternatively, this is realized by a "re-pressure" (e.g. by means of a pressure spring).

Figure 1B:
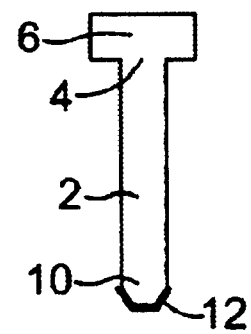
FIG. 1b shows a schematic representation of a transport means in the form of a pin for use in the pick-and-place device according to the present invention with an adhesive layer.

FIG. 1b shows a pin 2. The "tip" or head surface 10 thereof, which lies opposite to the end 4 comprising the mounting device 6, comprises an adhesive layer 12. The layer 12 is preferably only provided at the surface portion being brought in contact with the object 14 to be transported in order to keep the required amount of adhesive as low as possible.

Figure 2:
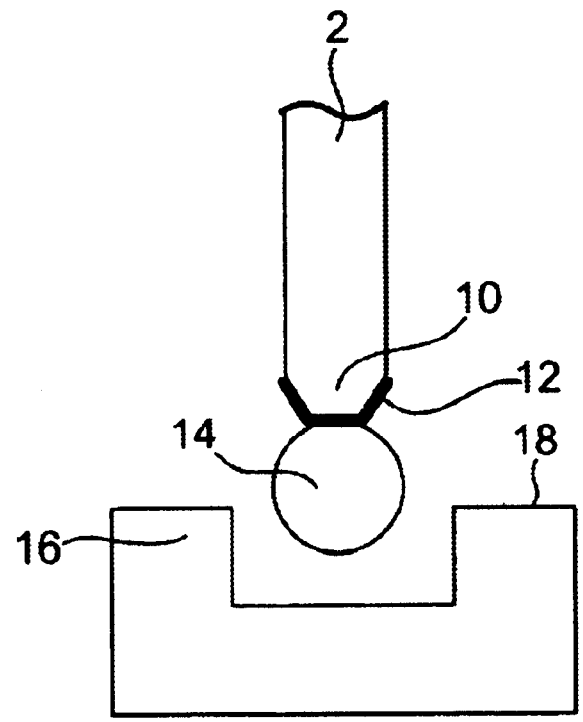
FIG. 2 shows a partial side view of a transport means to which an object to be transported adheres.

FIG. 2 shows the object 14 to the picked up in the form of a polystyrene bead, as it is used in chemical solid phase synthesis, in a container or a cavity 16 protecting it from lateral displacement. The center of gravity of the object 14 lies preferably below the upper edge 18 of the cavity 16. If the surface of the pin tip 10 is larger than the cavity 16, the bead 14 should partially project from the cavity 16 so that it can be contacted without any problems. After having brought in contact with the object 14 with the adhesive layer 12 being provided at the head surface 10 of the pin 2, the object 14 adheres to the adhesive surface 12 and can be removed from the cavity 16 by lifting the pin 2 or lowering the plate (not shown) comprising the cavity 16 and transported to the desired position. The cavities 16 can be arranged on a plate (not shown) in the form of a regular grid or array (FIG. 4) which does not have to be identical to the grid of containers or cavities of a target plate, for example a microtitre plate. Depending on the application, the array can be two- or three-dimensional. Possible array sizes are 12, 24, 96, 384, 1536, 9216, preferably more than 100. The pin tool preferably has 384 pins.

Figure 3A:
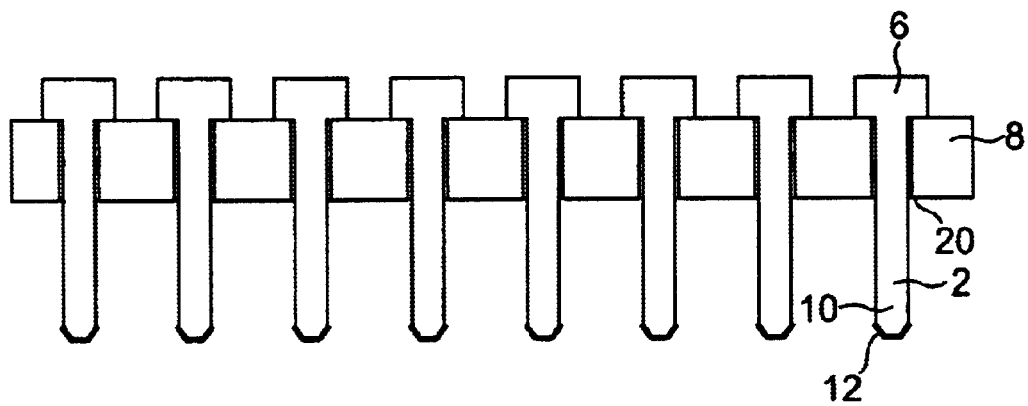
FIG. 3a shows a vertical sectional view through part of the pick-and-place device according to the present invention in which a plurality of transport means are arranged in an array and movably in the longitudinal direction.

FIG. 3a shows a line of an array consisting of pins 2 which are inserted in regularly arranged recesses 20 of the plate 8 up to the mounting device or the flange 6. The arrangement is realized such that a vertical movement or deflection of the pins 2 is possible in order to compensate for, for example, different lengths of the pins 2 or different sizes of the objects during placement of the objects 14 to be transported. This embodiment is furthermore advantageous because damage to or destruction of the objects to be transported can be avoided.

Figure 3B:
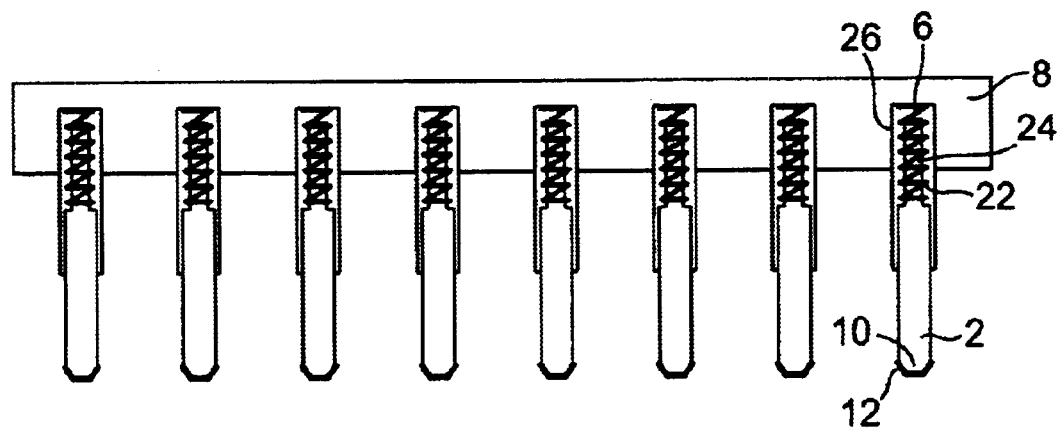
FIG. 3b shows a vertical sectional view through a further embodiment of part of the pick-and-place device according to the present invention in which a plurality of transport means are arranged in an array and resiliently movably in the longitudinal direction.

A further embodiment of holding the pins 2 in the plate 8 is shown in FIG. 3b. In this case the vertical movement of the pins 2 is caused by a respective spring 22 which extends over a guide portion 24 of the pin 2 and is supported in a blind hole 26 provided in the plate 8. When the pin 2 contacts a bead 14 provided in the cavity 16, the pin 2 according to this embodiment can perform a spring movement and thus compensate for possibly present differences in length as well as operation and production tolerances.

Figure 4:
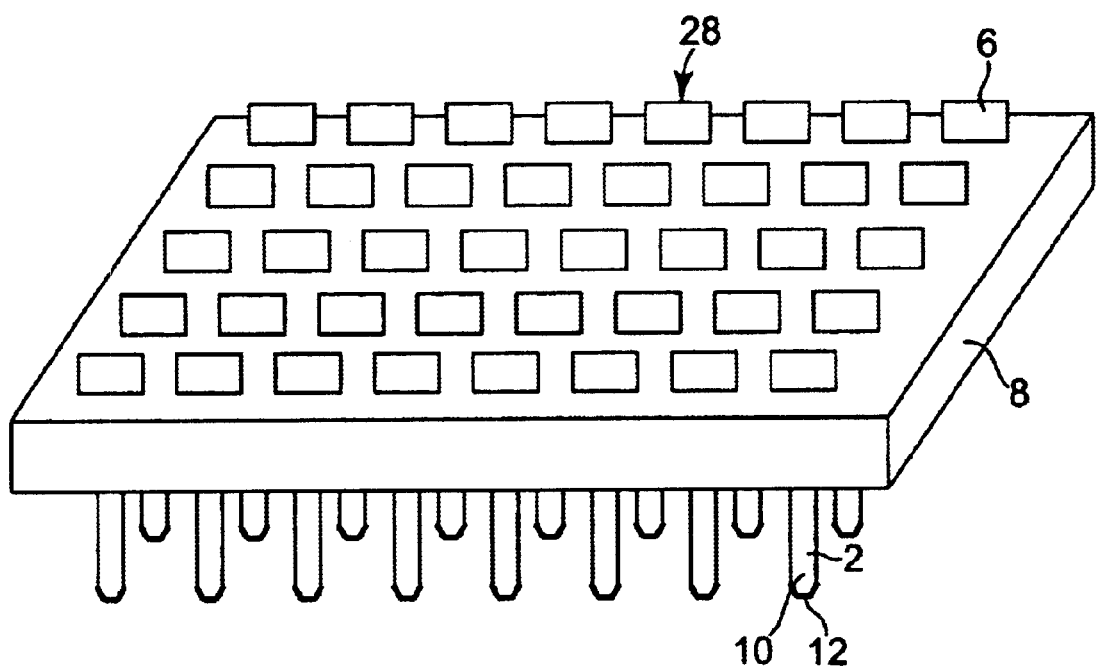
FIG. 4 shows a perspective view of the array arrangement shown as a sectional view in FIGS. 3a and 3b with the vertically movably transport means being provided with the adhesive.

FIG. 4 shows a receiving head 28 comprising a plurality of pins 2. The pins 2 are received in the recesses 20 (not shown) of the plate 8 by means of their mounting device 6. The number of pins 2 and the distance between the rows of pins and columns of pins of the array head 28 should be adapted to the geometry of the supporting plate (not shown), in particular to the geometry of the cavity 16 of the plate 8 being filled with one bead, and to the arrangement of the containers (e.g. a microtitre plate) which are filled with liquid and into which the beads 14 are placed.

In this connection it is not urgently necessary that the number of cavities 16 of the plate (not shown) for receiving the objects 14 corresponds to the number of pins 2 or the number of filled containers. It is also possible that an integral multiple of cavities 16 in the starting plate is present so that for example conventional microtitre plate formats or a plurality of microtitre plates can be filled by repeating the picking-up and placing operations several times. Also the number of filled containers (of the target plate) can be an integer multiple of the number of pins 2 or the plate or plates intended for lifting the objects 14. In this case it is advantageous to use a robot to the arm of which the array head 28 consisting of a plurality of pins 2 is attached. If a large number of pins 2 is present, a regular arrangement in rows and columns or in a concentric geometry is advantageous. If a computer-supported camera is used, the adjustment of the array head 28 and the entire process can be automated by means of a suitable software. Thus, a high degree of parallelism of the process is achieved and an efficient pick-and-place method is possible.

What is claimed is:

1. A method for picking up and placing objects (14) comprising the method steps:
    (a) immersing at least one portion (10) of a transport means (2) into a first liquid which is adhesive and/or contains adhesive substances in order to form an adhesive layer (12) at the portion (10) of the transport means (2);
    (b) removing the portion (10) from the first liquid;
    (c) bringing the adhesive layer (12) formed on the transport means (2) in contact with the object (14) to be transported;
    (d) transferring the object (14); and
    (e) placing the object (14) to be transported by immersing the adhesive layer (12) into a second liquid in order to reduce the adhesion of the adhesive layer (12) at least so much that the object (14) is released from the portion (10) of the transport means (2).

2. The method according to claim 1, wherein after formation of the adhesive layer (12) the portion (10) is subjected to a drying step in order to achieve a concentration of the adhesive substances contained in the first liquid.

3. The method according to claim 1, wherein a plurality of transport means (2) are arranged in an array as a transport unit (28) in order to transfer a plurality of objects (14) simultaneously.

4. The method according to claim 1, wherein the object (14) to be transported is placed by dissolution of the adhesive layer (12).

5. The method according to claim 1, wherein the object (14) to be transported is placed by immersing the adhesive layer (12) into a mixture or solution.

6. The method according to claim 1, wherein the adhesive liquid contains viscous compounds.

7. The method according to claim 6, wherein the viscous compounds are polyethylene glycols or polypropylene glycols.

8. The method according to claim 1, wherein the liquid containing adhesive substances is an aqueous sugar solution or concentrated saline solution.

9. The method according to claim 8, wherein the aqueous sugar solutions contain glucose, saccharose or maltose.

10. The method according to claim 1, wherein the liquid into which the adhesive layer (12) is immersed in order to place the object (14) is water, comprises an aqueous buffer or saline solution, an organic solvent and/or separating reagents.

11. The method according to claim 10, wherein the separating reagents simultaneously cause the separation of compounds adhering to the object (14).

12. The method according to claim 1, wherein the objects (14) to be transported are synthesis beads being used in combinatory solid-phase chemistry for drawing up combinatory substance libraries.

13. The method according to claim 1, wherein the transfer of the object (14) to be transferred is realized in that the latter is transported by means of the transport means (2).

14. The method according to claim 13, wherein the transfer operation of the object (14) to be transferred is realized in that the latter is lifted and lowered by means of the transport means (2) and the transfer operation takes place by at least one change between an object picking device and an object placing device.

15. A method for picking up and placing objects (14) comprising the method steps:
    (a) providing a transport unit (28) for a plurality of objects (14) to be transferred and comprising a plurality of projecting portions (10) each comprising an adhesive layer (12);
    (b) bringing in contact one projecting portion (10) of the transport unit (28) with a respective single object (14) to be transported;
    (c) transferring the objects (14) adhering to the respective adhesive layers (12) by moving the transport unit (28); and
    (d) placing the objects (14) by immersing the adhesive layer (12) into a liquid in order to reduce the adhesion of the adhesive layer (12) at least so much that the object (14) is released from the portion (10) of the transport unit (28).

16. The method according to claim 15, wherein the adhesive layer (12) is formed by immersion into a lint liquid being adhesive and/or comprising adhesive substances.

17. A method for picking up and placing objects (14) comprising the method steps:
    (a) providing a transport means (2) comprising an end portion (10) for at least one object (14) to be transferred and being provided with an adhesive layer (12);
    (b) bringing in contact the adhesive layer (12) formed at the transport means (2) with the object (14) to be transported;
    (c) transferring the object (14); and
    (d) placing the object (14) to be transported by immersing the adhesive layer (12) into a second liquid in order to reduce the adhesion of the adhesive layer (12) at least so much that the object (14) is released from the portion (10) of the transport means (2).

18. The method according to claim 17 wherein the transport means (2) is moved automatically by attaching it to a robot.

19. A method for picking up and placing objects (14) comprising the method steps:
   (a) providing a transport unit (28) for a plurality of objects (14) to be transferred, comprising a plurality of transport means (2) arranged in an ray and each comprising projecting portions (10) each having an adhesive layer (12);
   (b) bringing in contact the transport unit with the objects (14) to be transported, wherein the individual transport means (2) are guided in an axially movable manner in order to grip objects (14) having different sizes;
   (c) transferring the objects (14) adhering to the respective adhesive layers (12) by moving the transport unit (28); and
   (d) placing the objects (14).

20. A device for picking up and placing objects (14) comprising a transport means (2) with a free end portion (10) having an adhesive layer (12) for holding an object (14) to be transported, wherein the composition of the adhesive layer (12) is selected so that the adhesive layer (12) reduces its adhesion upon immersion in a predetermined liquid at least so much that the object (14) is released from the end portion (10) of the transport means (2), wherein the transport means (2) is provided at a robot in order to be moved automatically.

21. The device according to claim 20, wherein the adhesive layer (12) is an adhesive layer formed by immersing at least the end portion (10) of the transport means (2) into a liquid, wherein the liquid is adhesive and/or contains adhesive substances.

22. The device according to claim 21, wherein the adhesive liquid comprises viscous compounds.

23. The device according to claim 22, wherein the viscous compounds are polyethylene glycols or polypropylene glycols.

24. The device according to claim 21, wherein the liquid comprising adhesive substances is an aqueous sugar solution or concentrated saline solution.

25. The device according to claim 24, wherein the aqueous sugar solutions contain glucose, saccharose or maltose.

26. The device according to claim 20, wherein a plurality of transport means (2) are arranged in an array as a transport unit (28) in order to transfer a plurality of objects (14) simultaneously.

27. The device according to claim 20, wherein the liquid into which the adhesive layer (12) is immersed in order to reduce its adhesion is a mixture or solution.

28. The device according to claim 20, wherein the liquid into which the adhesive layer (12) is immersed in order to place the object (14) is water, comprises an aqueous buffer or saline solution an organic solvent and/or separating reagents.

29. The device according to claim 28, wherein the separating reagents simultaneously cause the separation of compounds adhering to the object (14).

30. The device according to claim 20, wherein the objects (14) to be transported are synthesis beads being used in combinatory solid-phase chemistry for drawing up combinatory substance libraries.

31. A device for simultaneously picking up and placing a plurality of objects (14) comprising a plurality of transport means (2) being arranged in a transport unit (28), said transport means (2) having an adhesive layer (12) at their respective end portions (10), wherein the transport means (2) are guided in the transport unit (28) in an axially movable manner in order to grip objects (14) having different sizes.

32. A method for picking up and placing objects comprising the method steps:
   (a) immersing at least one portion of a transport structure into a first liquid which is adhesive and/or contains adhesive substances in order to form an adhesive layer at the portion of the transport structure;
   (b) removing the portion from the first liquid;
   (c) contacting the adhesive layer with the object to be transported;
   (d) transferring the object; and
   (e) placing the object to be transported by immersing the adhesive layer into a second liquid in order to reduce the adhesion of the adhesive layer at least so much that the object is released from the portion of the transport structure.

33. The method of claim 32, wherein the transport structure is a rod or a pin.

34. A method for picking up and placing objects comprising the method steps:
   (a) providing a transport structure comprising an adhesive on at least a portion thereof;
   (b) contacting the adhesive with the object to be transported;
   (c) transferring the object; and
   (d) placing the object by immersing the adhesive into a second liquid in order to reduce the adhesion of the adhesive layer at least so much that the object is released from the transport structure.

35. A method for picking up and placing objects comprising the method steps:
   (a) providing a transport unit for a plurality of objects to be transferred, comprising a plurality of transport structures arranged in an array and each comprising projecting portions each having an adhesive layer;
   (b) contacting the transport unit with the objects to be transported, wherein the individual transport structures are guided in an axially movable manner in order to grip objects having different sizes;
   (c) transferring the objects adhering to the respective adhesive layers by moving the transport unit; and
   (d) placing the objects.

36. A device for picking up and placing objects comprising a transport structure comprising an adhesive on at least a portion thereof for holding an object to be transported, wherein the composition of the adhesive is selected so that the adhesive reduces its adhesion upon immersion in a predetermined liquid at least so much that the object is released from the transport structure and wherein the transport structure is provided at a robot in order to be moved automatically.

37. The device of claim 36, wherein the transport structure is a rod or a pin.

38. A device for simultaneously picking up and placing a plurality of objects comprising a plurality of transport structures being arranged in a transport unit, said transport structures having an adhesive, wherein the transport structures are guided in the transport unit in an axially movable manner in order to grip objects having different sizes.

* * * * *

UNITED STATES PATENT AND TRADEMARK OFFICE
CERTIFICATE OF CORRECTION

PATENT NO. : 6,695,369 B2
DATED : February 24, 2004
INVENTOR(S) : Schmidt et al.

It is certified that error appears in the above-identified patent and that said Letters Patent is hereby corrected as shown below:

Title page,
Item [30], Foreign Application Priority Data, "Sept. 1, 1999 (DE).....199 41 661" should be -- Sep. 1, 1999 (DE).....199 41 661.3 --.

Column 4,
Lines 44 and 46, "(not shown)" should be -- 8 --.

Column 5,
Lines 10 and 16, "(not shown)" should be -- 8 --.

Column 6,
Line 2, "...immersion into a lint liquid..." should be -- immersion into a first liquid --.

Column 7,
Line 5, "...arranged in an ray and..." should be -- arranged in an array and... --.

Signed and Sealed this

Tenth Day of August, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,695,369 B2
DATED : February 24, 2004
INVENTOR(S) : Schmidt et al.

It is certified that error appears in the above-identified patent and that said Letters Patent is hereby corrected as shown below:

Title page,
Item [30], Foreign Application Priority Data, "Sept. 1, 1999 (DE).....199 41 661" should be -- Sep. 1, 1999 (DE).....199 41 661.3 --.

Column 4,
Lines 44 and 46, "(not shown)" should be -- 8 --.

Column 5,
Lines 10 and 16, "(not shown)" should be -- 8 --.

Column 6,
Line 50, "...immersion into a lint liquid..." should be -- immersion into a first liquid --.

Column 7,
Line 5, "...arranged in an ray and..." should be -- arranged in an array and... --.

This certificate supersedes Certificate of Correction issued August 10, 2004.

Signed and Sealed this

Fifth Day of October, 2004

JON W. DUDAS
*Director of the United States Patent and Trademark Office*